July 5, 1949.  H. G. HOLMES  2,475,502
WHEEL MIRROR MOUNT
Filed Sept. 4, 1945  4 Sheets-Sheet 1
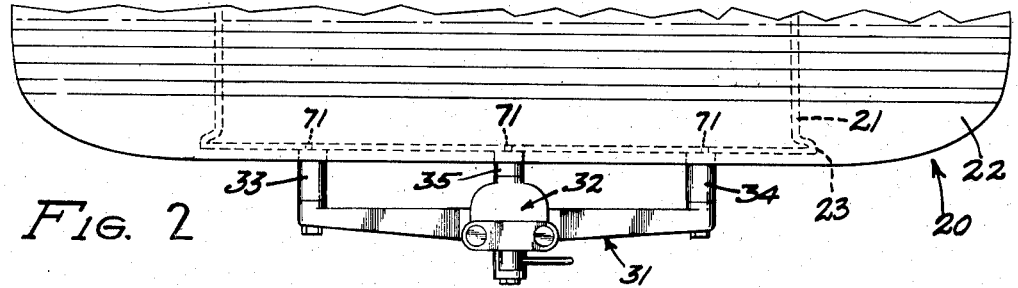
Fig. 2
Fig. 1
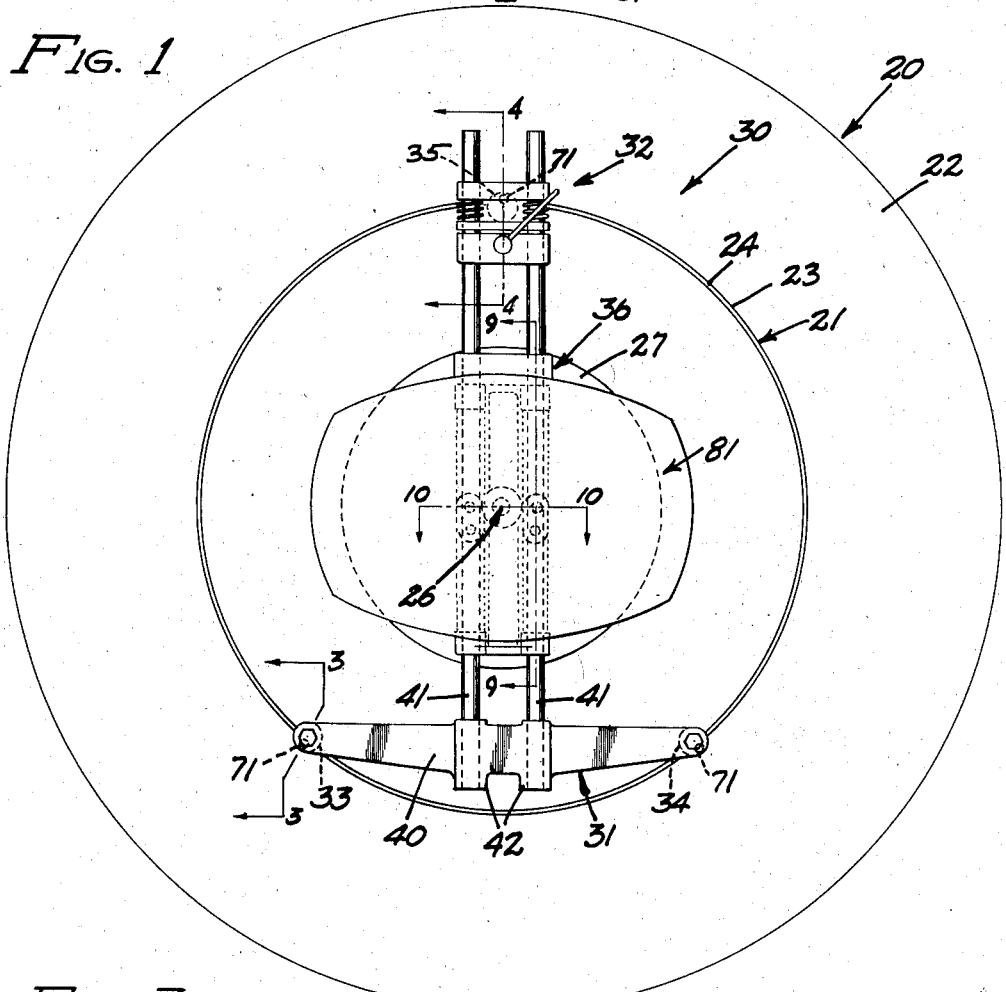
Fig. 3
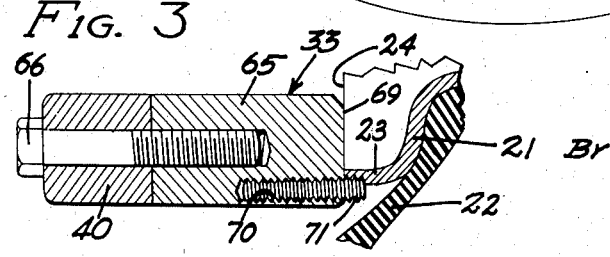
INVENTOR:
HERBERT G. HOLMES
By
ATTORNEY July 5, 1949.  H. G. HOLMES  2,475,502
WHEEL MIRROR MOUNT
Filed Sept. 4, 1945  4 Sheets-Sheet 2

INVENTOR:
H. G. HOLMES
By
ATTORNEY

July 5, 1949.  H. G. HOLMES  2,475,502
WHEEL MIRROR MOUNT
Filed Sept. 4, 1945  4 Sheets-Sheet 3
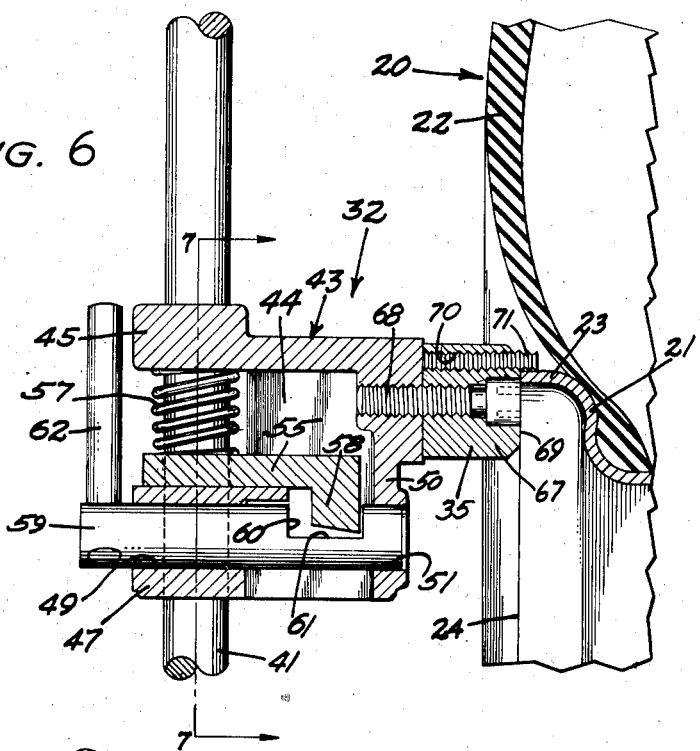
FIG. 6
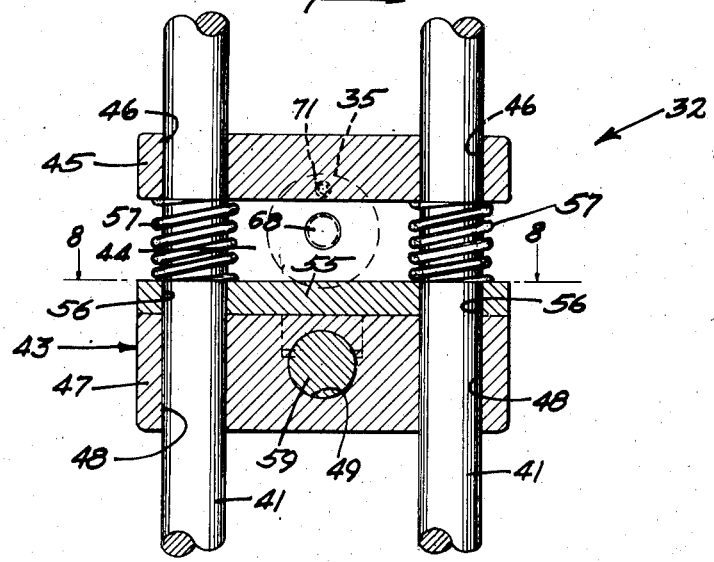
FIG. 7
INVENTOR:
HERBERT G. HOLMES
ATTORNEY

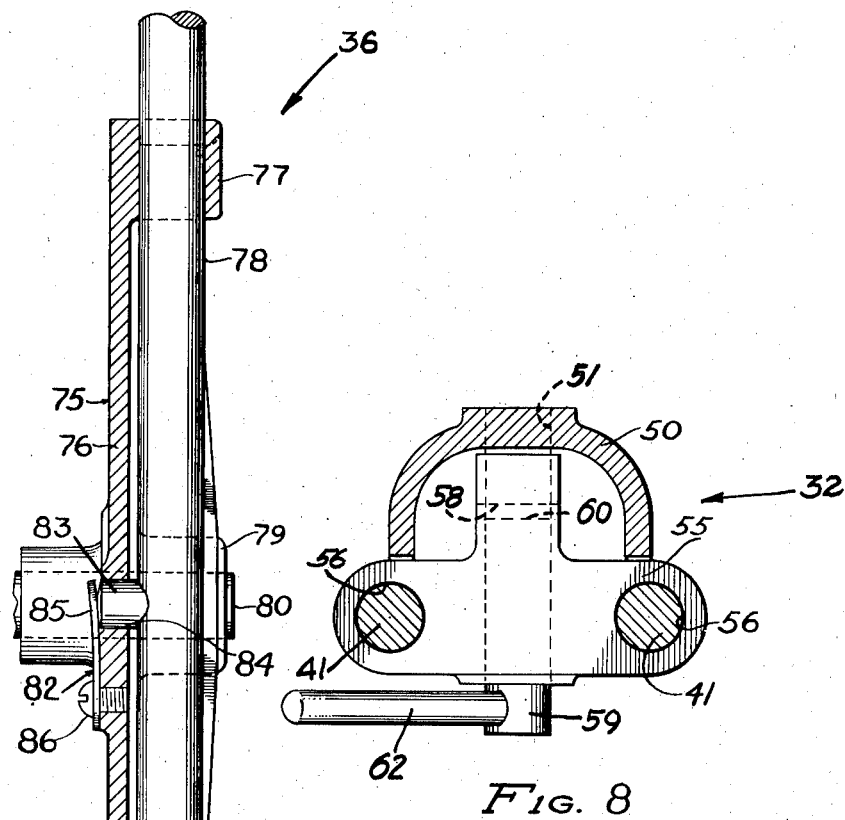
Fig. 8
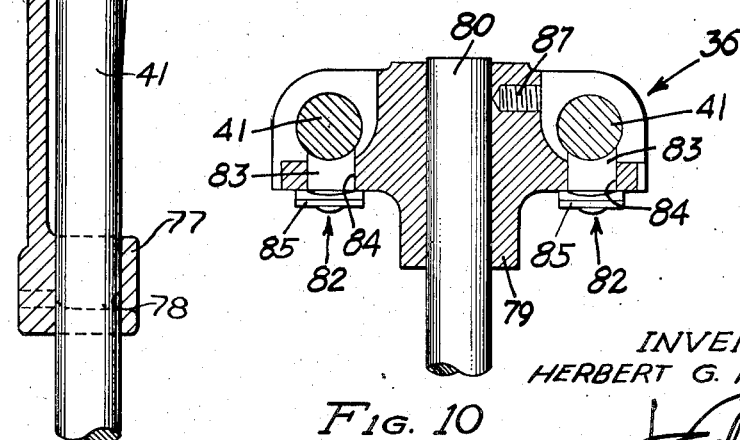
Fig. 9
Fig. 10
INVENTOR:
HERBERT G. HOLMES
BY
ATTORNEY Patented July 5, 1949

2,475,502

UNITED STATES PATENT OFFICE 2,475,502

WHEEL MIRROR MOUNT

Herbert G. Holmes, Lansing, Mich., assignor to Food Machinery and Chemical Corporation, a corporation of Delaware Application September 4, 1945, Serial No. 614,267

8 Claims. (Cl. 248—201)

This invention relates to the art of measuring the characteristics of alignment of vehicle wheels and is particularly useful in holding a device used in this art on a wheel while checking the latter.

This art has developed in the automotive field out of the necessity for periodically checking alignment characteristics of the wheels of automobiles and trucks and the making of corrections where these wheels are found to be out of proper alignment. Some of the systems developed in this art require the mounting of one of the devices of the apparatus employed directly on the wheel so that subsequent movements of the wheel will be reflected in significant corresponding changes in the attitude of said device.

It is an object of my invention to provide a mount suitable for application to a wheel and which will serve as a support for a device employed in checking the alignment characteristics of said wheel.

As the wheels which must be checked, as above indicated, vary considerably in diameter, it is another object of my invention to provide such a mount which may be readily adapted to fit and adhere to wheels of different diameters.

To be effective for their intended purpose it is necessary that certain devices, designed to be mounted on a wheel for the purpose of determining alignment characteristics of the wheel, must have a definite location relative to the axis of the wheel.

It is yet another object of the invention to provide a mount adapted to be applied to wheels differing in diameter, to act as a support for a device to be used in checking alignment characteristics of the wheels, and in which mount means is provided for readily accomplishing the desired relationship between said device and the axis of any of said wheels regardless of the diameter of the wheel.

Automobiles and trucks, the alignment of the wheels of which require checking, almost universally are of the type including a hub, a pressed sheet metal rim fixed on said hub, and a pneumatic tire mounted on said rim. Heretofore attempts to mount an alignment checking device on a wheel have generally engaged the tire both for the purpose of aligning the mount in parallelism with the wheel, and also for holding the mount on the wheel. This has proved faulty in that irregularities in the surface of the tire due to its being worn or damaged impair the alignment of the device with the wheel and the relatively large size of the tire causes the attaching means to be large and cumbersome.

It is an object of my invention to provide a wheel mount for an alignment checking device as aforesaid and which utilizes the metal rim of the wheel both as a means for holding the mount onto the wheel, and as a means for aligning the mount with the wheel.

The sheet metal rims employed almost universally in automobile and truck wheels terminate at their outer edge with what is practically a short cylindrical annular flange.

It is still another object of my invention to provide a mount applicable to the rim of such a wheel so that it may be supported on said wheel by engagement either with the interior surface or the exterior surface of the aforesaid rim flange, thereby making it possible to apply the mount accurately to the rim when one or the other of said surfaces is damaged or inaccessible for proper engagement.

It is necessary that the mount above referred to be applied manually to a wheel to be checked. The first step in applying the mount is to position this in properly adjusted relation with the wheel. The second step is to secure the mount in this position.

It is a still further object of my invention to provide a mount which can be applied manually with relative ease to a wheel in properly adjusted relation therewith and have a securing means thereon which may readily be actuated without removing the hands from the mount and, while it is still being held by the hands in said adjusted position, to rigidly secure the mount on said wheel.

In order that the alignment checking process may be accurately performed, it is extremely important that the mount above referred to be secured to the wheel being checked in a position which is parallel with the plane of the wheel. As the outer edges of the rims of such wheels are uniformly parallel with the plane of the wheel, these edges provide good points of contact for determining the correct position of the mount. The problem still remains of providing a simple means for holding the mount in its adjusted position contacting the outer edge of the rim.

It is another object of my invention to provide a mount for the purpose aforesaid having a means operable manually after the mount has been manually placed in adjusted relation with the rim in contact with the outer edge thereof, to engage said rim in such a manner as to firmly secure said mount on said rim so that said mount will remain indefinitely in proper aligned relation with the wheel and until the wheel checking operation has been completed and said mount securing means is released.

The manner of accomplishing the foregoing objects, as well as further objects and advantages, will be made manifest in the following description taken in connection with the accompanying drawings, in which:

Fig. 1 is a side elevational view of an automobile wheel with a preferred embodiment of the mount of my invention applied to the rim of said wheel and also showing a wheel mirror supported on said mount.

Fig. 2 is a fragmentary plan view of Fig. 1 showing said mount as applied to the rim of the wheel with the wheel mirror broken away.

Fig. 3 is an enlarged detail sectional view taken on the line 3—3 of Fig. 1 and illustrating one of the jaws and teeth of the invention as when operatively engaging the rim of a wheel on which said mount is fastened.

Fig. 6 is a view similar to Fig. 4 with the clutch-clamp of the invention in relaxed condition and freely slideable on the slide bars and positioned as just before actuation of the clutch-clamp to fasten the mount on a rim.

Fig. 7 is a vertical sectional view taken on the line 7—7 of Fig. 6.

Fig. 8 is a horizontal sectional view taken on the line 8—8 of Fig. 7.

Fig. 9 is an enlarged vertical sectional view taken on the line 9—9 of Fig. 1 and illustrating the device supporting slide of the invention and the detent mechanism thereof.

Fig. 10 is an enlarged horizontal sectional view taken on the line 10—10 of Fig. 1 and illustrating the detent mechanism of the device supporting slide.

Figure 4:
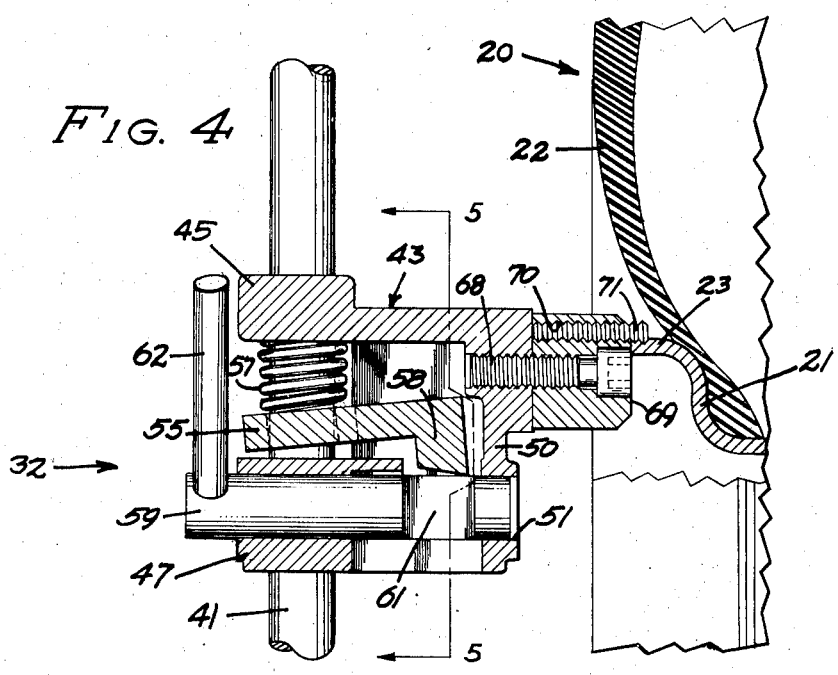
Fig. 4 is an enlarged vertical sectional view taken on the line 4—4 of Fig. 1 and illustrating in detail the clutch-clamp of the invention as when this is actuated in fastening said mount on said rim.

Referring specifically to the drawings and particularly to Figs. 1 to 10 inclusive, the wheel shown in Figs. 1 and 2 may be designated by the reference numeral 20, this wheel having a sheet metal rim 21 on which is mounted a pneumatic tire 22. As shown in the enlarged sectional views of Figs. 3, 4, and 6, the outer surface of the rim 21 is in contact with the tire 22 excepting for an edge portion 23 of the rim which is substantially cylindrical in shape. The edge surface 24 of the rim is, within fairly low tolerances, parallel with the central radial plane indicated by the broken line 25 in Fig. 2. The axis of the wheel 20 is indicated by the numeral 26 in Fig. 1. The hub and axle (not shown) of the wheel 20 are covered by the usual hub cap 27. (See Fig. 1.)

The invention is shown in the drawings as embodied in a mount 30 which includes a frame 31, a clutch-clamp 32, abutment jaws 33, 34 and 35 provided on said frame and on said clutch-clamp, and a device supporting slide 36.

The frame 31 is preferably T-shaped and includes a cross member 40 and a stem member which is preferably formed by a pair of slide bars 41 which are fixed in suitable sockets 42 provided in the cross member 40.

The clutch-clamp 32 includes a cast body 43 having a recess 44 which extends horizontally into said body from the rear and downwardly through the body as clearly shown in Figs. 4 and 6. This divides the body 43 into an upper bearing block 45, having slide bearing holes 46, a lower bearing block 47 having slide bearing holes 48, and a cam shaft bearing hole 49. The body 43 also has a front wall 50 having a bearing hole 51 therein in alignment with the hole 49.

Disposed in the recess 44 lying on top of the lower bearing block 47 is a clutch-plate 55 having holes 56 aligned with the slide bearing holes 46 and 48 of the body 43. Coiled expansion springs 57 are compressed between the plate 55 and the upper bearing block 45 and the slide bars 41 are so spaced as to be slideably received through these holes and the springs 56 as shown in Fig. 7.

The shape of the clutch-plate 55 in plan is shown in Fig. 8, it being noted that the holes 56 are enough larger than the slide bars 41 to permit the plate 55 to be cocked relative to these bars as shown in Fig. 4. Extending downwardly from the inner end of the clutch-plate 55 is a cam follower 58.

Journaling in the bearing holes 49 and 51 is a cam shaft 59 having a notch 60 which receives the cam follower 58 and forms an eccentric cam 61 of the balance of the shaft opposite this notch. The outer surface of the cam 61 is, however, concentric. The extending end of the shaft 59 is fitted with a finger lever 62.

The abutment jaws 33 and 34 are alike, each of these comprising a metal cylinder 65 which is secured to the cross member 40 by a cap screw 66. (See Fig. 3.) The jaws 35 comprises a similar but shorter metal cylinder 67 which is secured onto the front wall 50 of the clutch-clamp body 43 by a cap screw 68. The jaw cylinders 65 and 67 have inner abutment faces 69 and are provided with eccentric threaded holes 70 into which are screwed hardened threaded teeth 71 which are preferably headless screws formed of high carbon steel. The threads of the teeth 71 of course are sufficiently coarse so that they will make a good bite into softer metal such as the metal of the rims 21 against which they are pressed.

The device supporting slide 36 has a cast body 75 with a front wall 76 which unites slide bearings 77, having holes 78 through which the slide bars 41 freely slide, and a central socket 79 in which is mounted a shaft 80 for supporting a device such as a wheel mirror 81. Provided in the wall 76 are detent units 82 comprising plungers 83 slideably mounted in holes 84 and pressed against the slide bars 41 by leaf springs 85 secured to the wall 76 by screws 86. The shaft 80 may be held in the socket 79 as by a set screw 87. The detent units 82 apply sufficient pressure to the bars 41 to prevent accidental displacement of the slide 36 on these bars but still permitting the slide to be manually slid up or down on these bars for purposes of adjustment.

*Operation*

The mount 30 is adapted to be employed for temporarily supporting on the wheel 20 any device such as the wheel mirror 81 while the latter is being employed in checking one or more alignment characteristics of the wheel. The manner in which the wheel mirror 81 is employed when thus mounted to measure alignment characteristics is disclosed in a copending application for U. S. Letters Patent of Tracy Carrigan, Herbert G. Holmes, and Clyde A. Shoemaker, Ser. No. 571,716, filed January 5, 1945, on an Optical wheel aligner, now Patent No. 2,470,090. The wheel mirror 81 is adapted to serve the same function as the wheel mirror of the apparatus disclosed in said copending application.

For the mirror 81 to accurately perform its function, it must be mounted on the wheel 20 so that the plane of the mirror is parallel with the central radial plane 25 of the wheel. The plane of the edge surface 24 of the wheel rim 21 is parallel with the plane 25 and the shaft 80 of the mount 30 is perpendicular both to the plane of the jaw abutment faces 69 and to the center of the reflecting surface of the wheel mirror 81.

Thus, to position the wheel mirror 81 parallel with the wheel plane 25, the clutch-clamp 32 need merely be relaxed as shown in Figs. 6 and 7 and slid upon the slide bars 41 until the abutment faces 69 of the jaws 33, 34, and 35 are separated sufficiently so that all three of these faces can be brought to bear against the outer rim edge 24 as shown in Figs. 1 and 2. The assembled mount 30 and mirror 81 are then lifted until the teeth 71 of the jaws 33 and 34 bear against the outer surface of the rim 21. While the mount is thus held, the clutch-clamp 32 is allowed to slide downwardly until the tooth 71 thereof rests loosely on top of the rim 21.

Figure 5:
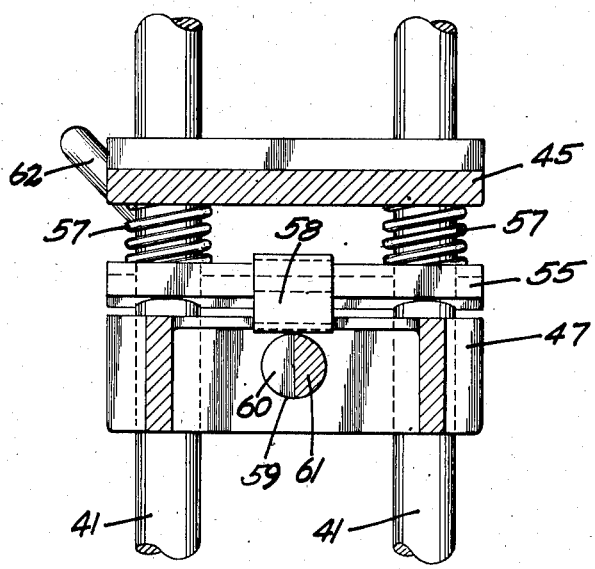
Fig. 5 is a vertical sectional view taken on the line 5—5 of Fig. 4.

The mount 30, while thus positioned, is now pressed inwardly firmly against the rim 21 and while it is so held, the handle 62 of the clutch-clamp 32 is swung downwardly to rotate the cam shaft 59. The first reaction of this rotation is to cause the cam 61 to lift on the cam follower 58 of the clutch-plate 55, thereby cocking this plate relative to the slide bars 41 as shown in Figs. 4 and 5. The holes 56 in the clutch-plate through which the slide bars 41 extend are just large enough for this plate to be cocked so that it binds against the slide bars when the plate reaches the limits of this cocking movement. The rotation of the shaft 59 is continued, however, with the result that the action of the cam 61 on the follower 58 is to slide the body block 43 downwardly on the slide bars 41 over a short distance but with considerable force. The force of this movement is sufficient to cause the hardened threads of all three of the teeth screws 71 to bite into the relatively soft metal of the rim 21 as shown in Figs. 3 and 5.

As this motion is completed, a concentric surface of the cam 61 is turned upwardly into contact with the follower 58 as shown in Figs. 4 and 5. This locks the clutch-clamp 32 in the position into which it was just moved on the slide bars 41 which maintains the teeth 71 in biting engagement with the wheel rim 21 until the cam shaft 59 is reversely rotated to restore the clutch-clamp 32 to slidable relation with the slide bars 41.

From the above description, it is clear that the mount 30 may be readily applied to the rim of any wheel of the standard type used on trucks and automobiles within a considerable range of sizes. It is also to be noted that adjustment of the mount 30 to the wheel is easily accomplished and that the hands need not be shifted from their position holding the mount, as when adjusting it, to effect a securing of the mount to the wheel in its adjusted position.

The mount 30 furthermore is relatively light as the cast parts may be made of aluminum so that the mount may be easily supported in the hands while it is being applied to or removed from a wheel.

Another distinctive advantage in the mount 30 of my invention is the fact that when it is adjusted to a wheel and actuated to secure the mount to the wheel, the securing means bites into the metal of the rim of the wheel and is then locked in this biting relation so that the mount can not possibly accidentally slip off during the checking operation, thereby injuring the apparatus supported by the mount on the wheel.

Another advantage of the securing means of the invention is that when the latter is actuated, while the mount is held in correctly adjusted relation with the wheel, the securing means positively unites the mount with the rim of the wheel without disturbing the position of the mount. The operator is thus given assurance that the mount will be in its original properly adjusted relation with the wheel throughout the checking operation.

It is another definite advantage of the mount 30 that it may not only be easily adjusted to various sized wheels and easily secured permanently in correct relation with any given wheel, but it may with equal ease be released and removed from the wheel by simply taking the mount in the hands, with one hand resting on the finger lever 62, rotating the latter to relax the clutch-clamp 32, and pulling the mount outwardly from the wheel. The teeth 71 readily slip outwardly off of the rim 21 as soon as the clutch-clamp 32 is relaxed from its gripping relation with the slide bars 41.

It has been found preferable to apply the mount 30 of my invention to the wheel rim 21 with the teeth 71 contacting the exterior face of the rim as shown in the drawings. In case a wheel is encountered in which space is not available to accommodate the teeth 71 outside the rim 21, the mount 30 may be readily modified so that it may be applied to the rim with the teeth 71 contacting the interior face of the rim 21. This is accomplished by loosening the cap screws 66, rotating the abutment jaws 33 and 34 a half turn each, and then again tightening the cap screws 66. The clutch-clamp 32 is then slipped off of the slide bars 41, inverted, and then replaced on these bars.

The mount 30 is now ready for application to the rim of a wheel with the teeth 71 engaging the interior surface of that rim. To so apply the mount 30, this is adjusted to the rim so that the abutment faces 69 of the abutment jaws 33, 34, and 35 rest against the edge surface 24 of the rim 21 with the teeth 71 all disposed inwardly with respect to the rim. The mount 30 is now lowered so that its weight is supported by the teeth 71 of the abutment jaws 33 and 34 resting on the rim. The clutch-clamp 32 is now slid upwardly to bring the tooth 71 thereof against the inner face of the rim. The finger lever 62 is now actuated to cause the clutch-plate 55 to grip the slide bars 41 and shift the clutch-clamp 32 upwardly forcefully to imbed the threads of the teeth 71 in the inner surface of the rim 21 and thus unite the mount 30 with the rim.

The relaxing of the clutch-clamp releases the mount 30 from this position in exactly the same manner as previously described for the position in which the teeth 71 are disposed outside the rim.

From the foregoing, it is clear that the mount 30 of my invention may be applied either by a constricting action causing the teeth to bite into the outer surface of the rim or an expanding action which causes the teeth 71 to bite into the inner surface of the rim.

It is also clear that whatever size of wheel the mount 30 of my invention may be applied to, it automatically assumes a position relative to the wheel in which the axis of the wheel is disposed equidistant from the slide bars 41. Thus, it is always possible by sliding the device supporting slide 36 on the bars 41, after the mount has been applied to a wheel 20, to bring the axis of the shaft 80, which is mounted on the slide 36, into coextensive alignment with the axis 26 of the wheel.

The accurate location of the mirror with its axis in coincidence with that of the wheel may be effected by lifting the wheel free of the floor on which it rests and rotating the wheel. The slide 36 is then adjusted on the bars 41 to eliminate any eccentricity of the mirror 81 relative to the wheel.

From this, it is clear that, by use of the mount 30 of my invention, a device such as the wheel mirror 81 may be readily and accurately mounted on a wheel in a given relationship with the axis of the wheel and retained indefinitely in said relationship.

What I claim is:

1. In a mount suitable for application to any of a variety of circular rims varying in diameter, the combination of: a frame; two spaced jaws provided thereon; means on said frame providing a slideway symmetrically disposed with respect to a plane bi-secting the line connecting said two jaws and perpendicular with said line; jaw means slideable along said slideway between various positions in which said jaw means is equidistant from said two jaws; teeth provided on said jaws and said jaw means and alternatively cooperatively disposable for internal action against said rim or external constrictive action against said rim when said jaw means and said jaws have been brought into simultaneous contact with the outer edge of said rim; and means operable alternatively for shifting said jaw means simultaneously relative to said frame with sufficient power to cause said teeth to bite uniformly into said rim either constrictively or expansively as the case may require and thereby securely position said mount on said rim.

2. In a mount suitable for application to any of a variety of circular rims varying in diameter, the combination of: a frame; two spaced jaws provided thereon; means on said frame providing a slideway symmetrically disposed with respect to a plane bi-secting the line connecting said two jaws and perpendicular with said line; jaw means slideable along said slideway between various positions in which said jaw means in equi-distant from said two jaws; teeth provided on said jaws and said jaw means and alternatively, co-operatively disposable for internal expansive action against said rim or external constrictive action against said rim when said jaw means and said jaws have been brought into simultaneous contact with the outer edge of said rim; means operable alternatively for shifting said jaw means relative to said frame with sufficient power to cause said teeth to bite into said rim either constrictively or expansively as the case may require and thereby securely position said mount on said rim; and an instrument support slideably mounted on said slideway to support and slideably adjust the position of an instrument to bring this into coaxial relation with said rim.

3. In a mount suitable for application to any of a variety of circular rims varying in diameter, the combination of: a T-shaped frame including a stem member and a cross member, said stem member comprising a pair of slide bars; two jaws mounted on opposite extremities of said cross member and extending therefrom in the same direction from the plane of said frame; a block slideable on said bars; jaw means provided on said block and extending in the same direction from the plane of said frame as said two jaws, said jaws and said jaw means having abutment faces lying in the same plane and adapted to be brought to bear against the outer edge of a rim in adjusting said mount to said rim; teeth provided on said jaws and jaw means and adapted to be positioned on one side of said rim with reference to its center when said mount is so adjusted said teeth extending beyond said abutment faces; and clutch means mounted on said block and adapted, when actuated, to grip said bars and then force said block along said bars to cause said teeth to bite into said rim and thereby securely position said mount on said rim in accurate alignment therewith.

4. In a mount adapted to be united with the tubular flange of a sheet metal wheel rim having an edge the surface of which lies in a radial plane, and exterior and interior cylindrical surfaces adjacent said edge surface, the combination of: a frame including slideway bar means, and a crosshead; a body slidable on said slideway bar means; three jaws, two of which are mounted on opposite ends of said crosshead and the other of which is mounted on said slidable body, said jaws having abutment faces lying in a given plane; teeth provided on said jaws and extending beyond said abutment faces, the shifting of said body adapting said jaws to be positioned with all of said abutment faces contacting said edge surface with all of said teeth in contact with one of said cylindrical surfaces; and a clutch clamp on said body the initial operation of which locks said body to said slideway bar means and the subsequent operation of which shifts said body in a given direction along said bar means, said body being reversible on said slideway bar means whereby said movement of said body by said clutch clamp may be selectively employed to accomplish a constriction of said teeth or an expansion of said teeth to cause said teeth to bite into the cylindrical surface with which they are in contact and thereby unite said mount with said rim.

5. In a mount suitable for application to any of a variety of circular rims varying in diameter, the combination of: a frame; two spaced jaws provided thereon; a third jaw shiftable on said frame between various positions substantially equidistant from said first two jaws; slideway means provided on said frame along a path which is aligned with the direction which said third jaw is shiftable on said frame; an instrument support slidably mounted on said slideway means to support an instrument on said mount and slidably adjust the position of said instrument to bring the same into coaxial relation with said rim; and means operative when said three jaws have been adjusted for simultaneous contact with said rim, and on the same side thereof with reference to its center, to cause relative movement between said third jaw and said first two jaws with sufficient power to cause said three jaws to bite into said rim and thereby securely position said mount on said rim.

6. In a mount suitable for application to any of a variety of circular wheel rims of different diameters to position an instrument in centered relation with said rim and in a predetermined geometrical relation with the plane of an edge of said rim, the combination of: a mount frame; two spaced jaws provided thereon; means on said frame providing a slideway aligned with and symmetrically disposed with respect to a plane perpendicular to and bisecting a line connecting corresponding points on said jaws; a slide slidable along said slideway; a third jaw mounted on said slide, said three jaws having rim edge contacting faces disposed in a plane parallel with said slideway; teeth provided on said jaws and adapted to be disposed to grip said rim when said jaw faces are all in engagement with said rim edge; means for shifting said slide along said slideway with said jaws so positioned, to jointly grip said rim with said teeth and thereby secure said mount on said rim; and an instrument support slidably mounted on said slideway whereby an instrument supported thereon may be brought into centered relation with said rim after said mount has been thus secured thereto.

7. A combination as in claim 6 in which said instrument support has an instrument mounting shaft which extends therefrom substantially perpendicular to the plane of said jaw faces.

8. A combination as in claim 6 in which said slide shifting means comprises a clutch clamp, the initial operation of which clamps said slide to said slideway, and the subsequent operation of which shifts said slide along said slideway to secure said mount on said rim.

HERBERT G. HOLMES.

REFERENCES CITED

The following references are of record in the file of this patent:

UNITED STATES PATENTS

| Number | Name | Date |
|---|---|---|
| 1,848,007 | Gilden | Mar. 1, 1932 |
| 1,884,370 | Swanson | Oct. 25, 1932 |
| 1,937,833 | Mondloch | Dec. 5, 1933 |
| 2,308,105 | Purdy | Dec. 11, 1939 |
| 2,312,955 | Camburn | Mar. 2, 1943 |
| 2,372,891 | Fenton | Apr. 3, 1945 |
| 2,402,041 | Greenleaf | June 11, 1946 |